(12) United States Patent
Takada et al.

(10) Patent No.: US 9,293,990 B2
(45) Date of Patent: Mar. 22, 2016

(54) SWITCHING REGULATOR AND ELECTRONIC APPARATUS

(71) Applicant: Seiko Instruments Inc., Chiba-shi, Chiba (JP)

(72) Inventors: Kosuke Takada, Chiba (JP); Michiyasu Deguchi, Chiba (JP); Hiroyuki Masuko, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 0 days.

(21) Appl. No.: 14/573,837

(22) Filed: Dec. 17, 2014

(65) Prior Publication Data
US 2015/0180335 A1 Jun. 25, 2015

(30) Foreign Application Priority Data

Dec. 24, 2013 (JP) .................................. 2013-265515

(51) Int. Cl.
*G05F 1/40* (2006.01)
*H02M 3/156* (2006.01)
*H02M 1/00* (2007.01)

(52) U.S. Cl.
CPC ...... *H02M 3/156* (2013.01); *H02M 2001/0025* (2013.01)

(58) Field of Classification Search
CPC ..... H02M 1/4225; H02M 3/157; H02M 1/36; Y02B 70/126; G05F 1/46
USPC ......... 323/207, 222–225, 271–275, 282–288; 363/17, 21.03, 79, 89
See application file for complete search history.

(56) References Cited

U.S. PATENT DOCUMENTS

| 6,728,121 B2 * | 4/2004 | Ben-Yaakov ....... H02M 1/4225 323/207 |
| 7,960,953 B2 * | 6/2011 | Inoue ..................... G05F 1/575 323/273 |
| 8,446,138 B2 * | 5/2013 | Ryoo .................... H02M 3/158 323/288 |
| 8,823,349 B2 * | 9/2014 | Kajiyama ............. H02M 3/157 323/283 |
| 2008/0007239 A1 | 1/2008 | Tsuzaki et al. |
| 2013/0193941 A1 * | 8/2013 | DeFazio ................... G05F 1/46 323/282 |

FOREIGN PATENT DOCUMENTS

JP 2008-11585 A 1/2008

* cited by examiner

*Primary Examiner* — Rajnikant Patel
(74) *Attorney, Agent, or Firm* — Brinks Gilson & Lione

(57) ABSTRACT

A switching regulator is provided which can prevent overshooting in an output voltage even when a source voltage is returned to a normal voltage from a voltage lower than a desired output voltage of the switching regulator. The switching regulator includes a 100% duty detector circuit that detects that a PWM comparator is in a 100%-duty state and a discharge accelerator circuit that detects that the output of an error amplifier discharges the voltage of a phase compensating capacitor and that accelerates the discharge, and activates the discharge accelerator circuit when the 100% duty detector circuit detects the 100%-duty state.

4 Claims, 4 Drawing Sheets

SWITCHING REGULATOR AND ELECTRONIC APPARATUS

RELATED APPLICATIONS

This application claims priority under 35 U.S.C. §119 to Japanese Patent Application No. 2013-265515 filed on Dec. 24, 2013, the entire content of which is hereby incorporated by reference.

BACKGROUND OF THE INVENTION

1. Field of the Invention

The present invention relates to a switching regulator that is disposed as a power source of a portable apparatus or an electronic apparatus so as to output a constant voltage, and more particularly, to an overshooting suppressing circuit that can suppress overshooting in an output voltage.

2. Background Art

FIG. 5 is a circuit diagram illustrating a switching regulator according to the related art.

The switching regulator according to the related art includes a power source terminal 101, a ground terminal 102, a reference voltage circuit 111 that outputs a reference voltage, a voltage divider circuit 112 that divides an output voltage VOUT of an output terminal 103, an error amplifier 110 that outputs a voltage VERR which is a comparison result of the divided voltage with the reference voltage, a ramp wave generator circuit 114 that generates a ramp wave VRAMP, a PWM comparator 113 that compares the voltage VERR with the ramp wave VRAMP and outputs a signal PWM, an output buffer 115, an output transistor 116, and a soft start circuit 117.

The operation of the switching regulator according to the related art will be described below.

When a voltage VDD is applied to the power source terminal 101, the error amplifier 110 compares the reference voltage VREF output from the reference voltage circuit 111 with the divided voltage VFB obtained by causing the voltage divider circuit 112 to divide the output voltage VOUT and outputs the voltage VERR. The PWM comparator 113 compares the voltage VERR with the ramp wave VRAMP and outputs the signal PWM to the output buffer 115. The output buffer 115 outputs the signal PWM to the output transistor 116 under the control of the output signal of the soft start circuit 117. The soft start circuit 117 has a function of slowly increasing the output thereof when the voltage VDD is applied to the power source terminal 101. Accordingly, by causing the output buffer 115 to slowly turn on the output transistor 116, the overshooting in the output voltage VOUT of the switching regulator is suppressed.

[Patent Document 1] Japanese Patent Application Laid-Open No. 2008-11585

SUMMARY OF THE INVENTION

However, in the switching regulator according to the related art including the soft start circuit, when the source voltage VDD becomes higher from a state in which the source voltage is lower than an output set voltage of the switching regulator, the soft start circuit does not work and overshooting occurs in the output voltage VOUT.

When the source voltage VDD is lower than the output set voltage of the switching regulator, the output voltage VERR of the error amplifier 110 has a value close to the source voltage VDD and the PWM comparator 113 is in a 100%-duty state, that is, a state in which the output transistor 116 is not switched but is normally turned on. When the source voltage VDD rapidly increases from this state, the output voltage VOUT of the switching regulator overshoots in the period of time until the output voltage VERR of the error amplifier 110 is returned to a normal value.

The invention is made to solve the above-mentioned problem and an object thereof is to provide a switching regulator that can prevent overshooting in the output voltage VOUT of the switching regulator even when the PWM comparator 113 is in the 100%-duty state.

In order to achieve the above-mentioned object, a switching regulator including an overshooting suppressing circuit according to the invention has the following configuration.

The switching regulator includes a 100% duty detector circuit that detects that a PWM comparator is in a 100%-duty state and a discharge accelerator circuit that detects that the output of an error amplifier discharges the voltage of a phase compensating capacitor and accelerates the discharge, and activates the discharge accelerator circuit when the 100% duty detector circuit detects the 100%-duty state.

Since the switching regulator including the overshooting suppressing circuit according to the invention has the above-mentioned configuration, it is possible to prevent the overshooting in the output voltage VOUT even when the source voltage VDD is returned to a normal voltage from a voltage lower than the desired output voltage of the switching regulator, that is, from the state in which the PWM comparator is in the 100%-duty state.

It is also possible to prevent erroneous operation or malfunction of a portable apparatus or an electronic apparatus working using the switching regulator as a power source.

DETAILED DESCRIPTION OF THE PREFERRED EMBODIMENTS

Figure 1:
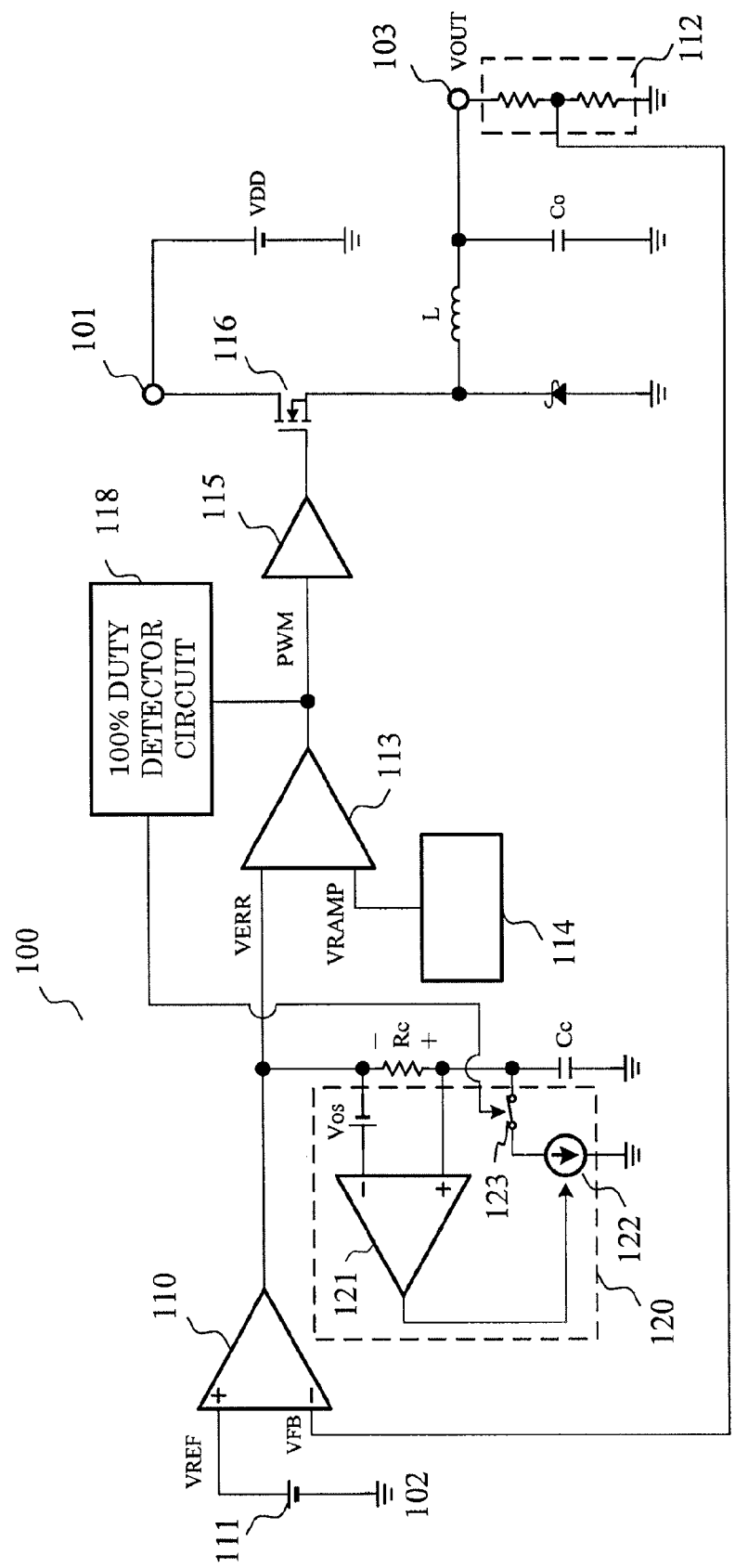
FIG. 1 is a circuit diagram illustrating an example of a switching regulator according to an embodiment of the invention.

FIG. 1 is a circuit diagram illustrating an example of a switching regulator according to an embodiment of the invention.

The switching regulator 100 according to this embodiment includes a power source terminal 101, a ground terminal 102, a reference voltage circuit 111 that outputs a reference voltage VREF, a voltage divider circuit 112 that divides an output voltage VOUT of an output terminal 103, an error amplifier 110 that outputs a voltage VERR which is the comparison result of the divided voltage VFB with the reference voltage VREF, a ramp wave generator circuit 114 that generates a ramp wave VRAMP, a PWM comparator 113 that compares the voltage VERR with the ramp wave VRAMP and that outputs a signal PWM, an output buffer 115, an output transistor 116, a 100% duty detector circuit 118, a discharge accelerator circuit 120, a phase compensating capacitor Cc, and a phase compensating resistor Rc.

The discharge accelerator circuit 120 includes an error amplifier 121 having an offset voltage Vos at the inverting input terminal, a constant current circuit 122, and a switch 123.

In the 100% duty detector circuit 118, the input terminal is connected to the output terminal of the PWM comparator 113 and the output terminal is connected to the control terminal of the switch 123 of the discharge accelerator circuit 120. In the error amplifier 121 of the discharge accelerator circuit 120, the inverting input terminal is connected to a connecting point of one terminal of the phase compensating resistor Rc and the output terminal of the error amplifier 110, the non-inverting input terminal is connected to the other terminal of the phase compensating resistor Rc, and the output terminal is connected to the control terminal of the constant current circuit 122. The switch 123 is connected between the phase compensating capacitor Cc and one terminal of the constant current circuit 122. The other terminal of the constant current circuit 122 is connected to the ground terminal 102.

Figure 2:
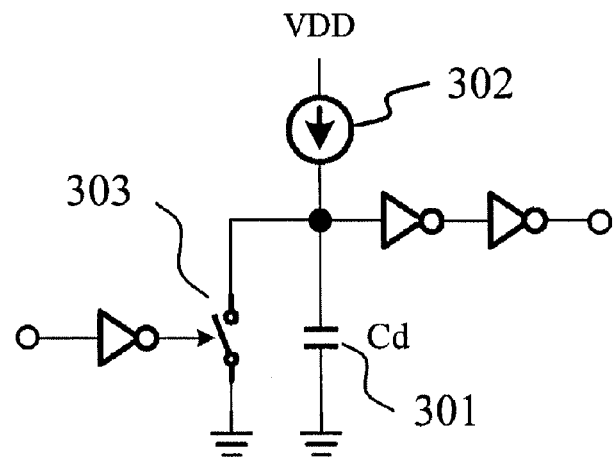
FIG. 2 is a circuit diagram illustrating an example of a 100% duty detector circuit.

FIG. 2 is a circuit diagram illustrating an example of the 100% duty detector circuit 118.

The 100% duty detector circuit 118 includes a capacitor 301, a constant current circuit 302, and a switch 303. The constant current circuit 302 is connected to the capacitor 301 so as to charge the capacitor 301. The switch 303 is connected to the capacitor 301 so as to discharge the capacitor 301.

In the 100% duty detector circuit 118, the capacitor 301 is charged by the constant current circuit 302 and the capacitor 301 is discharged by the switch 303. The switch 303 is controlled by the signal PWM. Accordingly, in a normal state in which the signal PWM repeatedly varies between Hi and Lo, the capacitor 301 is discharged and the output terminal is maintained in the Lo state. When the signal PWM is switched to a 100%-duty state and is maintained in the Hi state, the capacitor 301 is not discharged and thus the output terminal outputs a Hi signal when the voltage of the capacitor 301 is greater than a threshold value of an inversion circuit. That is, the 100% duty detector circuit 118 detects the 100% duty ratio.

The operation of the switching regulator according to this embodiment will be described below.

Figure 3:
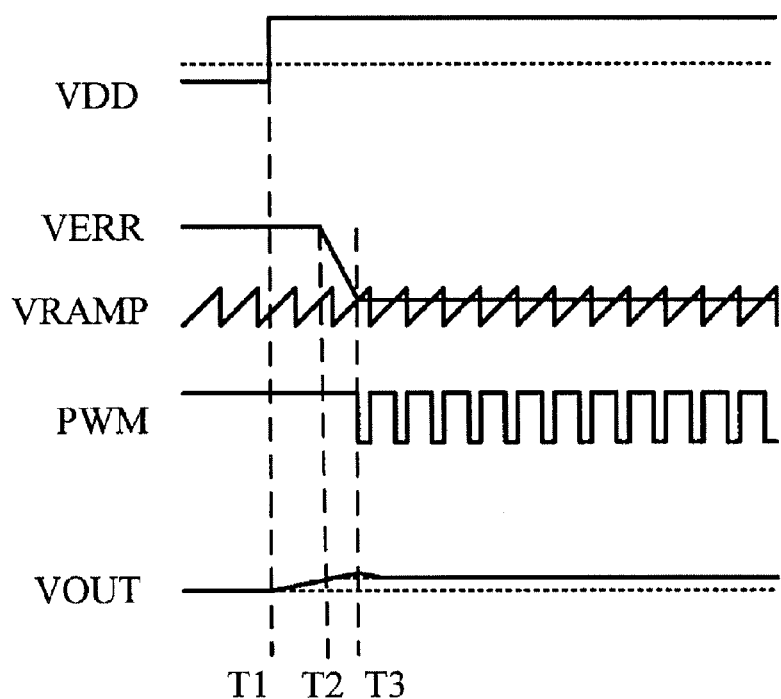
FIG. 3 is a diagram illustrating an operation of the switching regulator according to the invention.

FIG. 3 is a diagram illustrating the operation of the switching regulator according to this embodiment.

Until time T1, the source voltage VDD is a voltage lower than a desired output voltage (voltage indicated by a dotted line) of the switching regulator and the divided voltage VFB is a voltage lower than the reference voltage VREF. Since the output voltage VERR of the error amplifier 110 is at a Hi level and does not intersect the ramp wave VRAMP, the signal PWM is maintained in the Hi state. Accordingly, since the output transistor 116 is turned on, the output voltage VOUT is equal to the source voltage VDD. At this time, since the signal PWM is maintained in the Hi state, the 100% duty detector circuit 118 detects the 100% duty ratio. Accordingly, the output of the 100% duty detector circuit 118 is at the Hi level and the switch 123 of the discharge accelerator circuit 120 is turned on.

At time T1, when the source voltage VDD is returned to a normal voltage, the output transistor 116 is turned on and thus the output voltage VOUT increases.

At time T2, when the divided voltage VFB becomes higher than the reference voltage VREF, that is, when the output voltage VOUT becomes the desired output voltage (voltage indicated by the dotted line), the error amplifier 110 controls the output voltage VERR to the Lo level so as to decrease the output voltage VOUT. Since the output terminal of the error amplifier 110 is connected to the phase compensating resistor Rc and the phase compensating capacitor Cc, a certain degree of time is required until the voltage VERR reaches a normal value intersecting the ramp wave VRAMP.

Here, when the output voltage VERR of the error amplifier 110 decreases, a current flows in the output terminal of the error amplifier 110 from the phase compensating capacitor Cc via the phase compensating resistor Rc. The error amplifier 121 of the discharge accelerator circuit 120 detects the current from the voltages at both ends of the phase compensating resistor Rc and controls the constant current circuit 122 so as to be turned on. When the constant current circuit 122 is turned on, the output voltage VERR of the error amplifier 110 decreases (period from T2 to T3) and rapidly decreases until the normal value intersecting the ramp wave VRAMP.

At time T3, when the voltage VERR intersects the ramp wave VRAMP, the signal PWM output from the PWM comparator 113 becomes a rectangular wave. Accordingly, since the output voltage VOUT is controlled so as to be a desired voltage, the overshooting is suppressed. Since the output of the 100% duty detector circuit 118 is switched to the Lo level and the switch 123 of the discharge accelerator circuit 120 is turned off, the voltage VERR is changed to the normal state in which it is controlled by the output voltage of the error amplifier 110.

As described above, the switching regulator according to this embodiment can prevent the overshooting in the output voltage VOUT even when the source voltage VDD is returned to the normal voltage from a voltage lower than the desired output voltage of the switching regulator, that is, from, the state in which the PWM comparator 113 is in the 100%-duty state.

Figure 4:
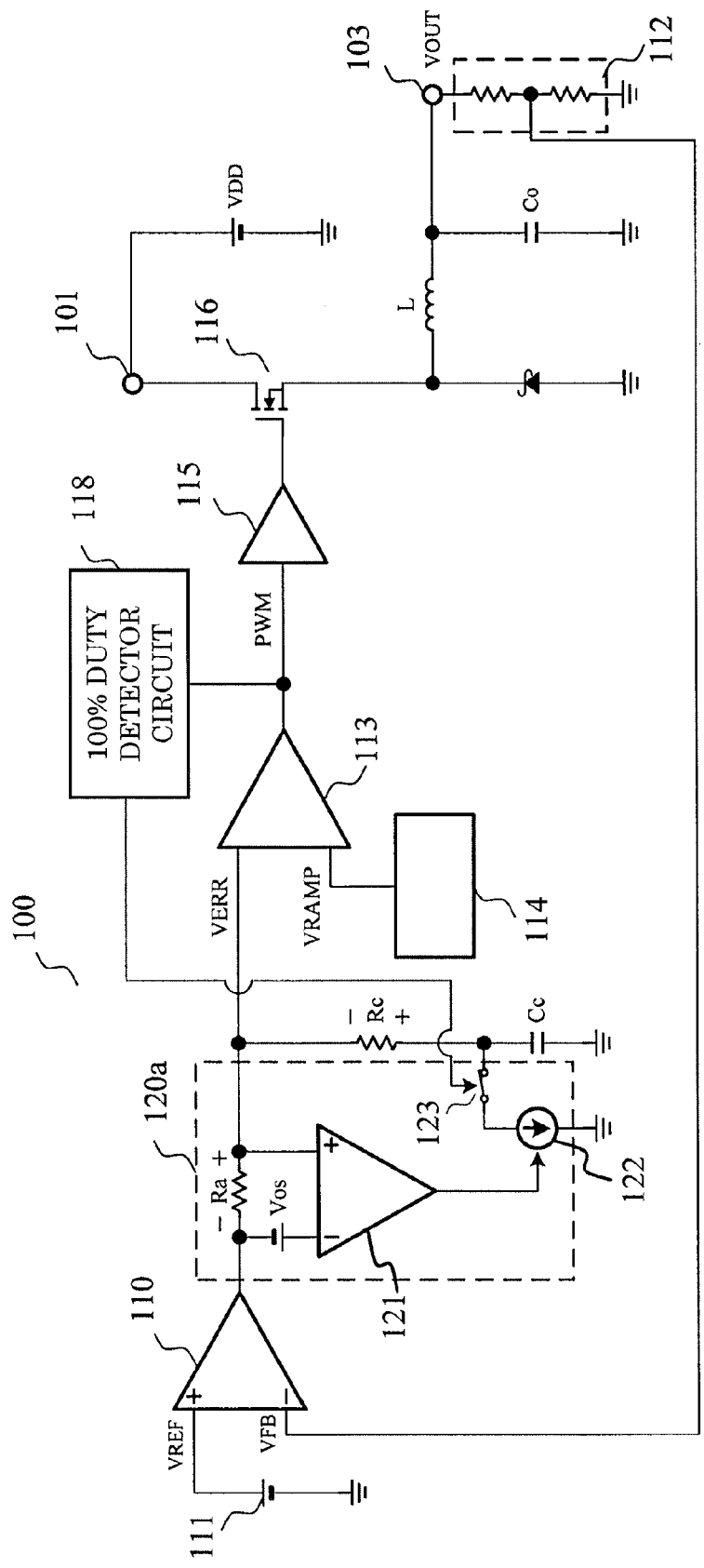
FIG. 4 is a circuit diagram illustrating another example of the switching regulator circuit according to the embodiment.
Figure 5:
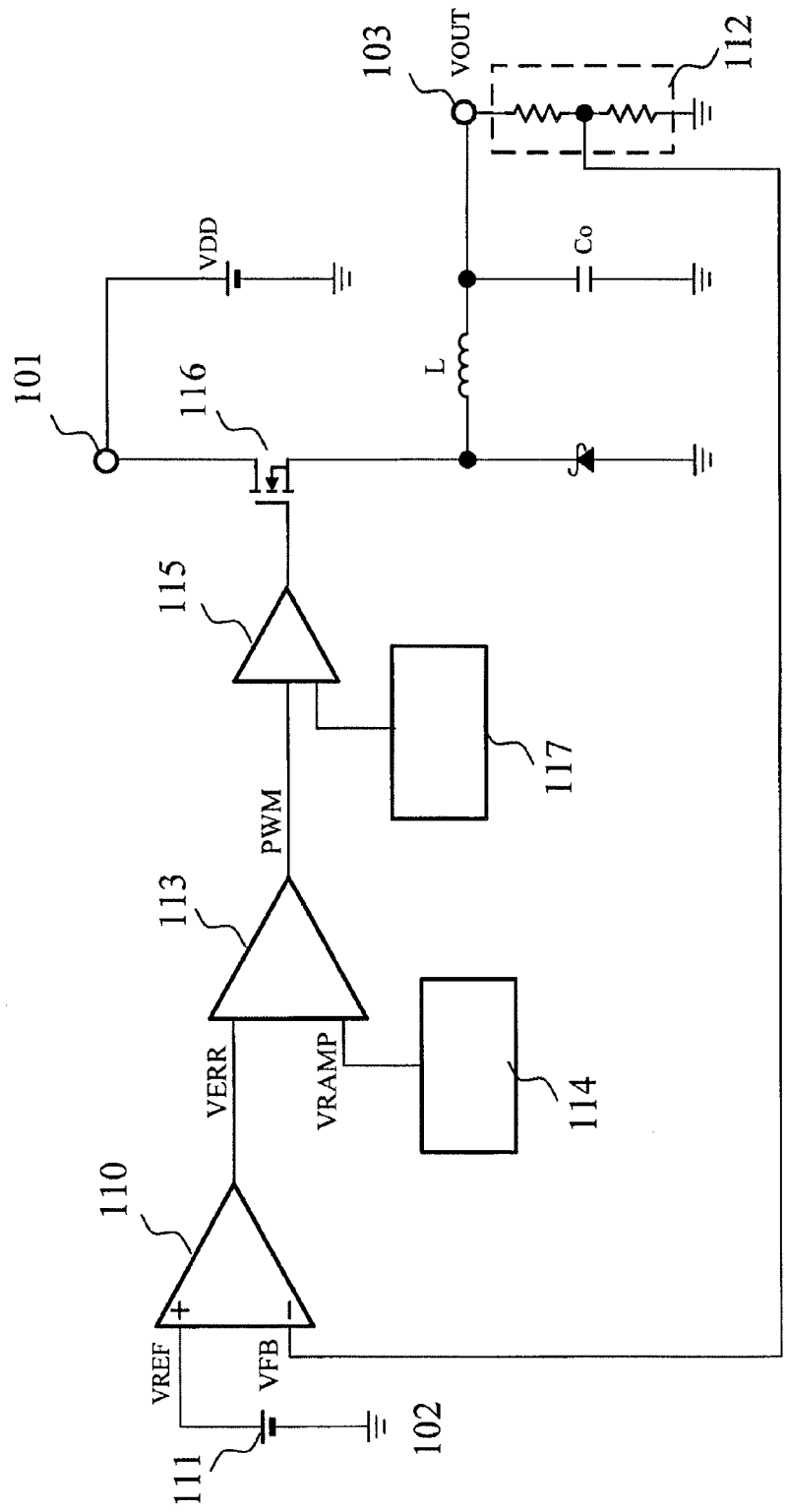
FIG. 5 is a circuit diagram illustrating a switching regulator according to the related art.

FIG. 4 is a circuit diagram illustrating another example of the switching regulator according to this embodiment.

A discharge accelerator circuit 120a of the switching regulator illustrated in FIG. 4 includes a current detection resistor Ra between the output terminal of the error amplifier 110 and the input terminal of the PWM comparator 113. The error amplifier 121 detects the voltages at both ends of the current detection resistor Ra. The other circuit configurations are the same as in the switching regulator illustrated in FIG. 1 and thus detailed description thereof will not be repeated. By employing the configuration illustrated in FIG. 4, the same advantageous effect as in the circuit illustrated in FIG. 1 can be achieved.

The invention has been described using the circuit of the switching regulator in a voltage mode, but the invention can be applied to a circuit in a current mode and the same advantageous effect can be achieved. In this case, the ramp wave VRAMP which has been described as a triangular wave in FIG. 3 is a voltage obtained by feeding back the current of the output transistor 116 in the current mode.

As described above, since the switching regulator according to the invention can prevent the overshooting in the output voltage VOUT, it is possible to prevent erroneous operation or malfunction of a portable apparatus or an electronic apparatus working using the switching regulator as a power source.

What is claimed is:
1. A switching regulator comprising:
an error amplifier that amplifies and outputs a difference between a divided voltage obtained by dividing a voltage output from an output transistor and a reference voltage;
a ramp wave generator circuit that generates a ramp wave;
a PWM comparator that compares the output voltage of the error amplifier with the ramp wave and that outputs a signal PWM;
a 100% duty detector circuit that detects that the signal PWM has a 100% duty ratio;

a phase compensating capacitor and a phase compensating resistor that are disposed in an output terminal of the error amplifier; and a discharge accelerator circuit that detects that the output of the error amplifier discharges the voltage of the phase compensating capacitor and that accelerates the discharge when the signal PWM has a 100% duty ratio.

2. The switching regulator according to claim 1, wherein the discharge accelerator circuit includes a second error amplifier that compares voltage at both ends of the phase compensating resistor, a switch that is connected to the phase compensating capacitor and that is controlled by a detection signal of the 100% duty detector circuit, and a constant current circuit that is connected to the switch and that is controlled by an output voltage of the second error amplifier.

3. The switching regulator according to claim 1, wherein the discharge accelerator circuit includes a current detection resistor that is disposed between the output terminal of the error amplifier and the input terminal of the PWM comparator, a second error amplifier that compares voltages at both ends of the current detection resistor, a switch that is connected to the phase compensating capacitor and that is controlled by a detection signal of the 100% duty detector circuit, and a constant current circuit that is connected to the switch and that is controlled by an output voltage of the second error amplifier.

4. An electronic apparatus comprising the switching regulator according to claim 1.

* * * * *